US009254845B2

(12) United States Patent
Park

(10) Patent No.: US 9,254,845 B2
(45) Date of Patent: Feb. 9, 2016

(54) SYSTEM FOR PREVENTING VEHICLE COLLISION USING YAW RATE AND METHOD OF PREVENTING VEHICLE COLLISION USING THE SAME

(71) Applicant: MANDO CORPORATION, Pyeongtaek-si, Gyeonggi-do (KR)

(72) Inventor: Man Bok Park, Seoul (KR)

(73) Assignee: Mando Corporation, Pyeongtaek-si, Gyeonggi-do (KR)

(*) Notice: Subject to any disclaimer, the term of this patent is extended or adjusted under 35 U.S.C. 154(b) by 2 days.

(21) Appl. No.: 14/308,497

(22) Filed: Jun. 18, 2014

(65) Prior Publication Data

US 2014/0379216 A1 Dec. 25, 2014

(30) Foreign Application Priority Data

Jun. 19, 2013 (KR) .................. 10-2013-0070166

(51) Int. Cl.
*B60W 30/09* (2012.01)
*B60W 10/02* (2006.01)
*B60W 10/18* (2012.01)
*B60W 10/20* (2006.01)
*B60W 10/184* (2012.01)
(Continued)

(52) U.S. Cl.
CPC ............... *B60W 30/09* (2013.01); *B60W 10/18* (2013.01); *B60W 10/184* (2013.01); *B60W 10/20* (2013.01); *B60W 30/0953* (2013.01); *B60W 30/0956* (2013.01); *B60W 30/18163* (2013.01); *B60W 2520/14* (2013.01)

(58) Field of Classification Search
CPC ..... B60W 10/20; B60W 10/18; B60W 30/12; B60W 10/184; B60W 2520/14; B60W 2540/18; B60W 40/114; B60T 2230/02; B60T 8/17552
See application file for complete search history.

(56) References Cited

U.S. PATENT DOCUMENTS 5,479,173 A * 12/1995 Yoshioka et al. ............... 342/70
5,878,362 A * 3/1999 Sekine et al. .................... 701/41
(Continued)

FOREIGN PATENT DOCUMENTS

KR 10-0164060 B1 9/1998
KR 10-0221684 B1 9/1999
(Continued)

*Primary Examiner* — James Trammell
*Assistant Examiner* — Demetra Smith-Stewart
(74) *Attorney, Agent, or Firm* — McDermott Will & Emery LLP

(57) ABSTRACT

A system for preventing vehicle collision according to the present invention includes a steering detection part configured to detect collision with an object, a calculation part configured to calculate a yaw rate of a vehicle and to calculate a target steering angle, a brake control part configured to control a steering operation of the vehicle according to the target steering angle, and a wheel control part interlocked with the brake control part and configured to control the steering operation of the vehicle according to the target steering angle.

And a method of preventing vehicle collision according to the present invention includes estimating collision with an object at a steering detection part of a vehicle, calculating a yaw rate of the vehicle at a calculation part, calculating a target steering angle according to the yaw rate calculated by the calculation part, and performing a steering operation for returning the vehicle according to the target steering angle by at least one of a wheel control part and a brake control part.

7 Claims, 5 Drawing Sheets

(51) Int. Cl.
*B60W 30/095* (2012.01)
*B60W 30/18* (2012.01)

(56) References Cited

U.S. PATENT DOCUMENTS

| | | | |
|---|---|---|---|
| 6,571,176 B1 * | 5/2003 | Shinmura et al. | 701/301 |
| 7,016,783 B2 * | 3/2006 | Hac et al. | 701/301 |
| 7,171,296 B2 * | 1/2007 | Kato et al. | 701/70 |
| 8,165,753 B2 * | 4/2012 | Shoda et al. | 701/41 |
| 8,694,224 B2 * | 4/2014 | Chundrlik et al. | 701/84 |
| 2008/0015778 A1 * | 1/2008 | Matsuura et al. | 701/301 |
| 2009/0228174 A1 * | 9/2009 | Takagi et al. | 701/41 |
| 2011/0106381 A1 * | 5/2011 | Filev et al. | 701/40 |
| 2012/0310480 A1 * | 12/2012 | Schmidt | 701/41 |
| 2012/0323477 A1 * | 12/2012 | Flehmig | 701/301 |
| 2013/0090825 A1 * | 4/2013 | Park | 701/70 |
| 2014/0288785 A1 * | 9/2014 | Bretzigheimer | B60T 8/17558 701/48 |

FOREIGN PATENT DOCUMENTS

| | | |
|---|---|---|
| KR | 1019980054228 A | 7/2004 |
| KR | 10-2006-0068324 A | 6/2006 |
| KR | 10-0588563 B1 | 6/2006 |

\* cited by examiner

Fig. 4
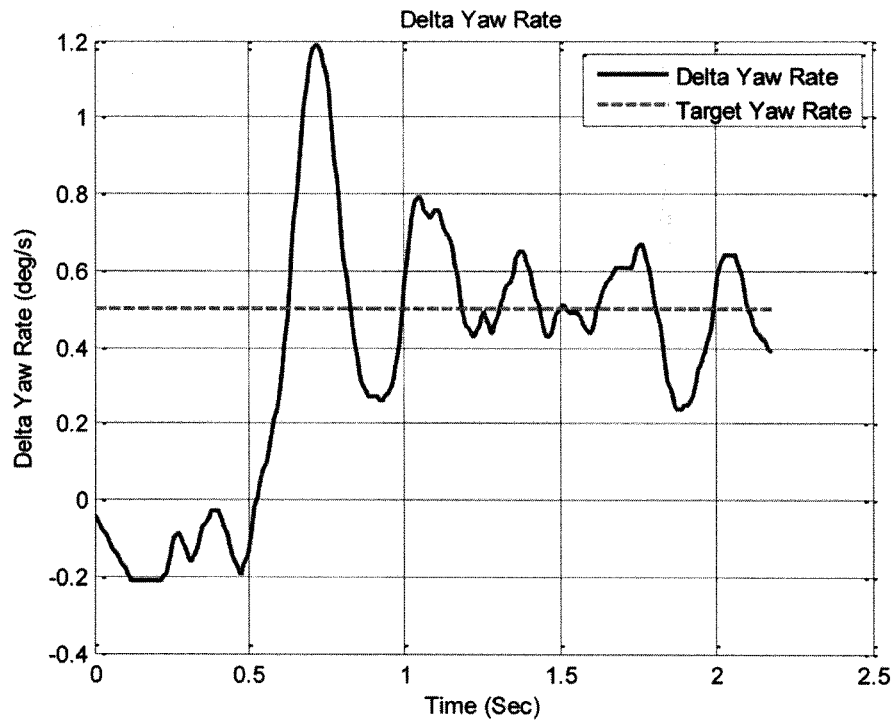

Fig. 5
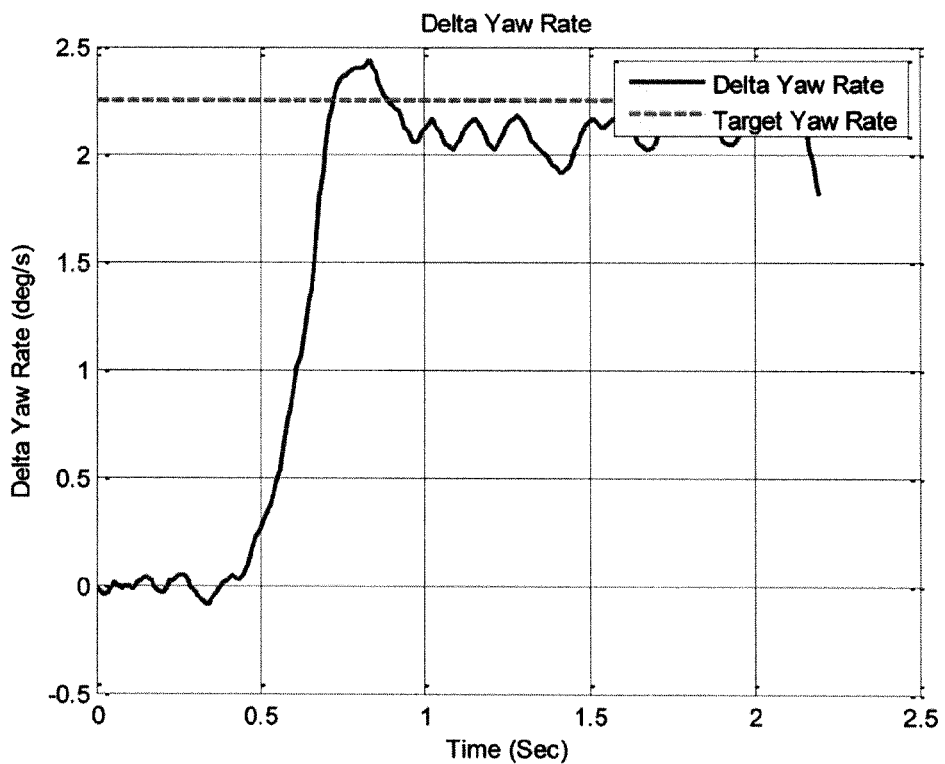
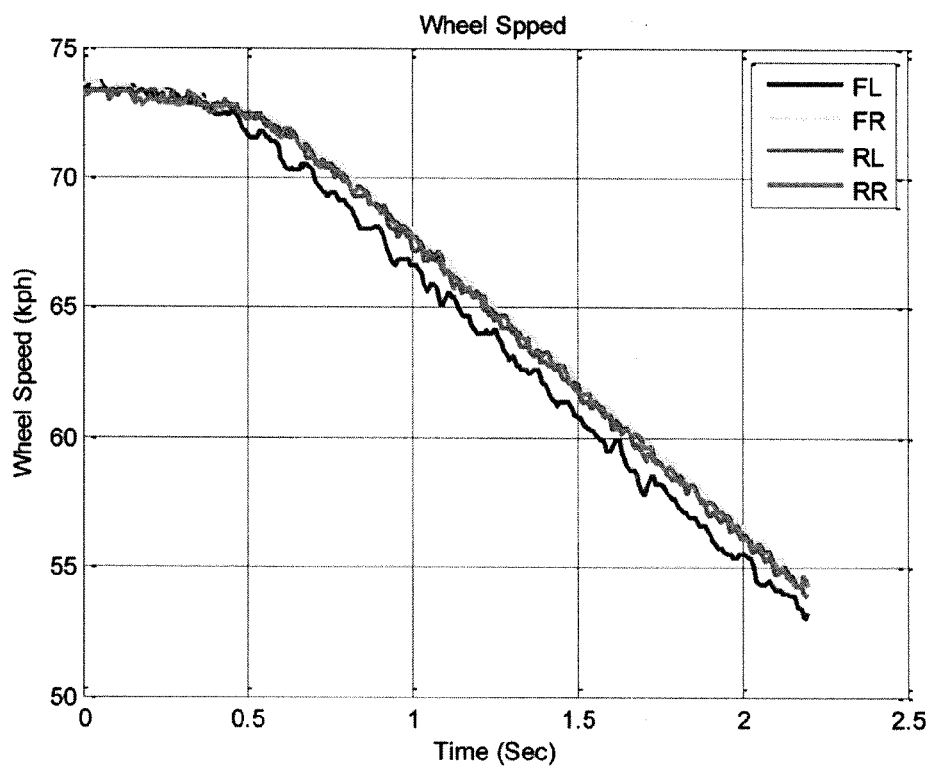

SYSTEM FOR PREVENTING VEHICLE COLLISION USING YAW RATE AND METHOD OF PREVENTING VEHICLE COLLISION USING THE SAME

CROSS-REFERENCE TO RELATED APPLICATIONS

The present application is claims the benefit of priority to Korean Patent Application No. 10-2013-0070166, filed on Jun. 19, 2013, the entire contents of which is incorporated herein for all purposes by this reference.

BACKGROUND

1. Field of the Invention

The present invention relates to a system for preventing vehicle collision, which prevents collision between vehicles in a situation of lane change, or the like, using a yaw rate and a method of preventing vehicle collision using the same.

2. Discussion of Related Art

Recently, auxiliary systems for automatically avoiding collision when it is expected to collide with another vehicle running on the corresponding lane in a situation of lane change or the like when a vehicle is running are being developed and researched.

A conventional auxiliary system for automatically avoiding collision determines whether there are other vehicles in a corresponding direction using a sensor installed at the vehicle, automatically controls a steering apparatus when the collision is expected, and returns the vehicle to its original lane.

However, in this case, a driver may have resistance, may be confused by the sudden movement of a wheel, and thus may cause a secondary accident.

Further, since it is difficult to precisely calculate a control angle, when controlling the wheel, it is difficult to completely return the vehicle to its original lane.

Therefore, a method of solving the above-mentioned problems is required.

PRIOR ART DOCUMENTS

Patent Documents

Patent document 1: Korean Patent No.10-0588563

SUMMARY OF THE INVENTION

The present invention is directed to a system for preventing vehicle collision using a yaw rate, and a method of preventing vehicle collision using the same, which may minimize user's confusion due to a returning control of a vehicle and provide a comfortable ride, and thus may reduce a secondary accident.

The present invention is also directed to a system for preventing vehicle collision using a yaw rate, and a method of preventing vehicle collision using the same, which may precisely calculate a control angle for controlling a wheel.

Additional aspects of the invention will be set forth in part by the description which follows and, in part, will be obvious from the description, or may be learned by practice of the invention.

According to an aspect of the present invention, there is provided a method of preventing vehicle collision, including estimating collision with an object at a steering detection part of a vehicle, calculating a yaw rate of the vehicle at a calculation part, calculating a target steering angle according to the yaw rate calculated by the calculation part, and performing a steering operation for returning the vehicle according to the target steering angle by at least one of a wheel control part and a brake control part.

The method may further include comparing the calculated yaw rate with a threshold value by the calculation part between the calculating of the target steering angle and the performing of the steering operation for returning the vehicle.

In the performing of the steering operation for returning the vehicle, the brake control part may perform the steering operation for returning the vehicle according to the target steering angle, when the calculated yaw rate is less than the threshold value.

In the performing of the steering operation for returning the vehicle, the wheel control part may subsidiarily perform the steering operation of the vehicle, when a slip greater than or equal to a preset reference value is generated at a wheel controlled while the brake control part performs the steering operation.

In the performing of the steering operation for returning the vehicle, the brake control part and the wheel control part may simultaneously perform the steering operation of the vehicle, when the calculated yaw rate is greater than or equal to the threshold value.

In the performing of the steering operation for returning the vehicle, the brake control part may perform the steering operation of the vehicle by the threshold value, and the wheel control part may perform the steering operation of the vehicle by a difference between the target steering angle and the threshold value, when the calculated yaw rate is greater than or equal to the threshold value.

According to another aspect of the present invention, there is provided a system for preventing vehicle collision, including a steering detection part configured to detect collision with an object, a calculation part configured to calculate a yaw rate of a vehicle and to calculate a target steering angle, a brake control part configured to control a steering operation of the vehicle according to the target steering angle, and a wheel control part interlocked with the brake control part and configured to control the steering operation of the vehicle according to the target steering angle.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 4 is a graph illustrating the yaw rate change per time when the target steering angle is 1 degree per second; and FIG. 5 is a graph illustrating the yaw rate change per time when the target steering angle is 2.25 degrees per second.

| [Detailed Description of Main Elements] | |
|---|---|
| 30: steering wheel | 40: wheel |
| 110: steering detection part | 120: calculation part |
| 130: wheel control part | 140: brake control part |

DETAILED DESCRIPTION OF EXEMPLARY EMBODIMENTS

A system for preventing vehicle collision using a yaw rate, and a method of preventing vehicle collision using the same according to the present invention will be described in detail below with reference to the accompanying drawings.

Figure 1:
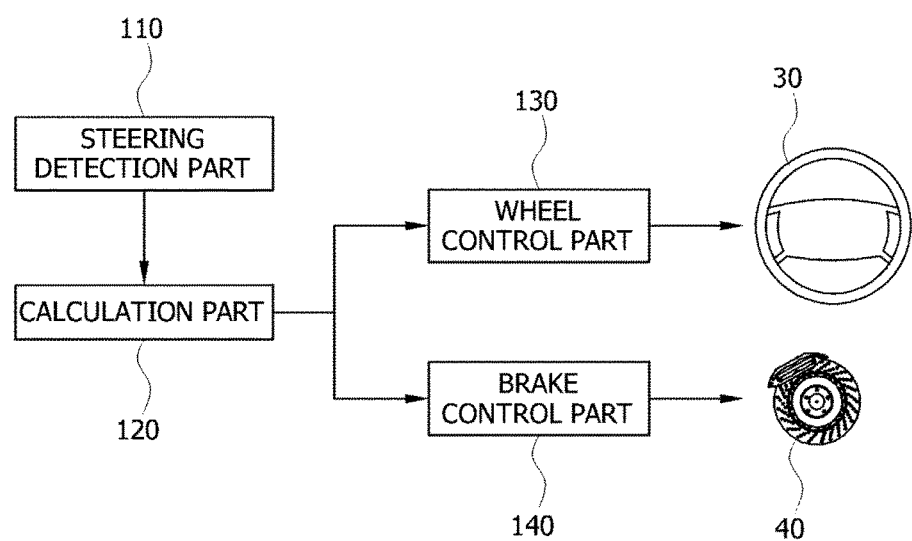
FIG. 1 is a view illustrating each element of a system for preventing vehicle collision using a yaw rate in accordance with one embodiment of the present invention.

FIG. 1 is a view illustrating each element of a system for preventing vehicle collision using a yaw rate in accordance with one embodiment of the present invention.

As illustrated in FIG. 1, the system for preventing vehicle collision using a yaw rate according to one embodiment of the present invention includes a steering detection part 110, a calculation part 120, a wheel control part 130, and a brake control part 140.

The steering detection part 110 is a construction element configured to detect collision with another object in a situation of lane change of a vehicle, or the like, and may be formed in various types for grasping position information of the other object, such as a distance sensor, wireless communication, and GPS.

That is, the steering detection part 110 previously recognizes a situation in which collision with the other object such as a vehicle and a structure may occur when the vehicle is turned.

The calculation part 120 is a construction element configured to calculate a yaw rate of the vehicle and to calculate a target steering angle.

That is, when it is expected by the steering detection part 110 to collide with the object, the calculation part 120 may calculate the yaw rate of the vehicle, and thus may calculate the target steering angle to return to an original position.

At this time, when calculating the yaw rate of the vehicle, the steering detection part 110 may perform the role. Otherwise, various separate yaw rate detection parts such as infrared sensors and gravity sensors may be provided to perform such operations.

The wheel control part 130 and the brake control part 140 are construction elements interlocked with each other and configured to control a steering operation of the vehicle. That is, the wheel control part 130 may control a steering wheel 30 of the vehicle, and the brake control part 140 may control a brake of each wheel 40.

At this time, the wheel control part 130 and the brake control part 140 may simultaneously perform the steering operation of the vehicle according to an absolute value of the target steering angle, whether a slip of the vehicle occurs, or the like, or only the brake control part 140 may control the steering of the vehicle. This will be described later.

Figure 2:
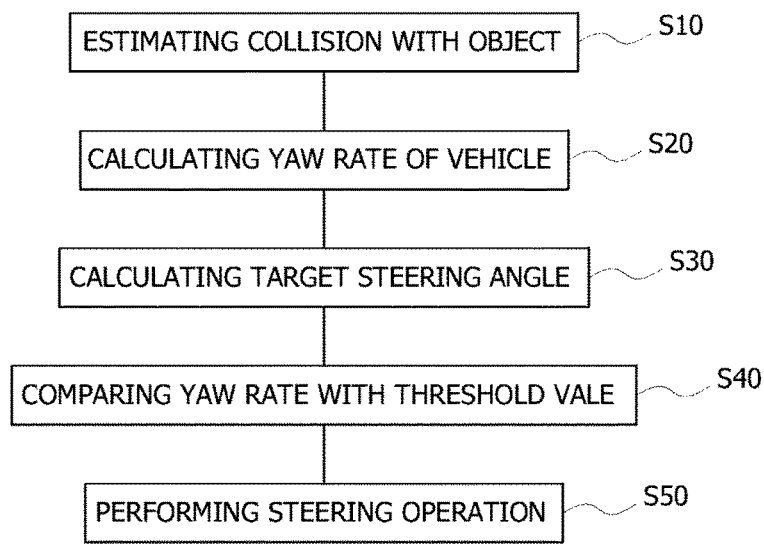
FIG. 2 is a flowchart illustrating each process of a method of preventing vehicle collision using the yaw rate in accordance with one embodiment of the present invention.

FIG. 2 is a flowchart illustrating each process of a method of preventing vehicle collision using the yaw rate in accordance with one embodiment of the present invention.

As illustrated in FIG. 2, the method of preventing vehicle collision using the yaw rate according to one embodiment of the present invention includes a process S10 of estimating collision with an object, a process S20 of calculating a yaw rate of a vehicle, a process S30 of calculating a target steering angle, a process S40 of comparing the yaw rate with a threshold value, and a process S50 of performing a steering operation.

The process S10 of estimating the collision with the object is a process which estimates the collision with the object at the steering detection part of the vehicle. The steering detection part 110 previously recognizes a situation in which collision with the objet such as other vehicle and structure may occur due to turning of the vehicle.

The process S20 of calculating the yaw rate of the vehicle is a process in which the calculation part calculates the yaw rate of the vehicle. That is, when it is estimated to collide with the object in the process S10, the yaw rate of the vehicle is calculated.

In the process S30 of calculating the target steering angle, the calculation part calculates the target steering angle according to the calculated yaw rate, and the steering control operation will be changed according to the calculated target steering angle.

To this end, the process S40 of comparing the yaw rate with the threshold value may be performed. In this process, the calculation part compares the calculated yaw rate with the threshold value.

The threshold value is a preset value. When the yaw rate is less than the threshold value, only the brake control part may perform the steering operation so that the vehicle is returned according to the target steering angle.

And when the yaw rate is greater than or equal to the threshold value, the brake control part and the wheel control part may simultaneously perform the steering operation of the vehicle.

This is because, when the steering wheel is controlled, a user generally has resistance with respect to the steering, is confused by the sudden movement of the wheel, and thus may cause a secondary accident. Therefore, it is necessary to minimally perform controlling of the steering wheel. A predetermined degree or more of the steering operation may be performed by differential braking occurred by separately controlling the brake in each wheel.

That is, when the yaw rate is less than the threshold value, only the differential braking is performed, and when the yaw rate is greater than or equal to the threshold value, the differential braking and the controlling of the steering wheel are simultaneously performed so that the vehicle is returned.

More specifically, when the yaw rate is greater than or equal to the threshold value, the brake control part performs the steering of the vehicle by the threshold value, and thus the wheel control part may perform the steering of the vehicle by a difference between the target steering angle and the threshold value. In this case, the controlling of the steering wheel may be minimized After the process S40 of comparing the yaw rate with the threshold value, the process S50 of performing the steering operation is performed. In this process, at least one of the wheel control part and the brake control part performs the steering operation to return the vehicle. At this time, as described above, the differential braking and the controlling of the steering wheel may simultaneously performed, or the differential braking or the controlling of the steering wheel may be performed alone.

Meanwhile, in the process of performing the steering operation to return the vehicle, if the slip of the controlled wheel, which is greater than a preset reference value, is generated when the brake control part performs the steering operation, the wheel control part may subsidiarily perform the steering operation of the vehicle. That is, when only the differential braking is performed, or when the slip of the controlled wheel, which is greater than the preset reference value, is generated while the differential braking is performed by the threshold value, the steering wheel may be subsidiarily controlled to increase safety.

As described above, when the steering wheel is controlled simultaneously, the steering angle of the steering wheel may be calculated by the following equation 1, and calculated results may be embodied by MDPS (Motor Driving Power Steering).

$$\begin{bmatrix} \dot{V}_y \\ \dot{\gamma} \\ \dot{e}_y \\ \dot{e}_\varepsilon \end{bmatrix} = \begin{bmatrix} a_{11} & a_{12} & 0 & 0 \\ a_{21} & a_{22} & 0 & 0 \\ 1 & 0 & 0 & V_x \\ 0 & 1 & 0 & 0 \end{bmatrix}$$ Equation 1

$$\begin{bmatrix} V_y \\ \dot{\gamma} \\ e_y \\ e_\varepsilon \end{bmatrix} + \begin{bmatrix} \frac{C_f}{m} \\ l_f \cdot \frac{C_f}{I_z} \\ 0 \\ 0 \end{bmatrix} \delta_f + \begin{bmatrix} 0 \\ 0 \\ 0 \\ -V_x \end{bmatrix} K_L + \begin{bmatrix} 0 \\ \frac{1}{I_z} \\ 0 \\ 0 \end{bmatrix} M_z$$

$$a_{11} = -\frac{C_f + C_r}{m \cdot V_x} \quad a_{12} = -V_x + \frac{-l_f \cdot C_f + l_r \cdot C_r}{m \cdot V_x}$$

$$a_{21} = -\frac{l_f \cdot C_f + l_r \cdot C_r}{I_z \cdot V_x} \quad a_{22} = -\frac{l_f^2 \cdot C_f + l_r^2 \cdot C_r}{I_z \cdot V_x}$$

Figure 3:
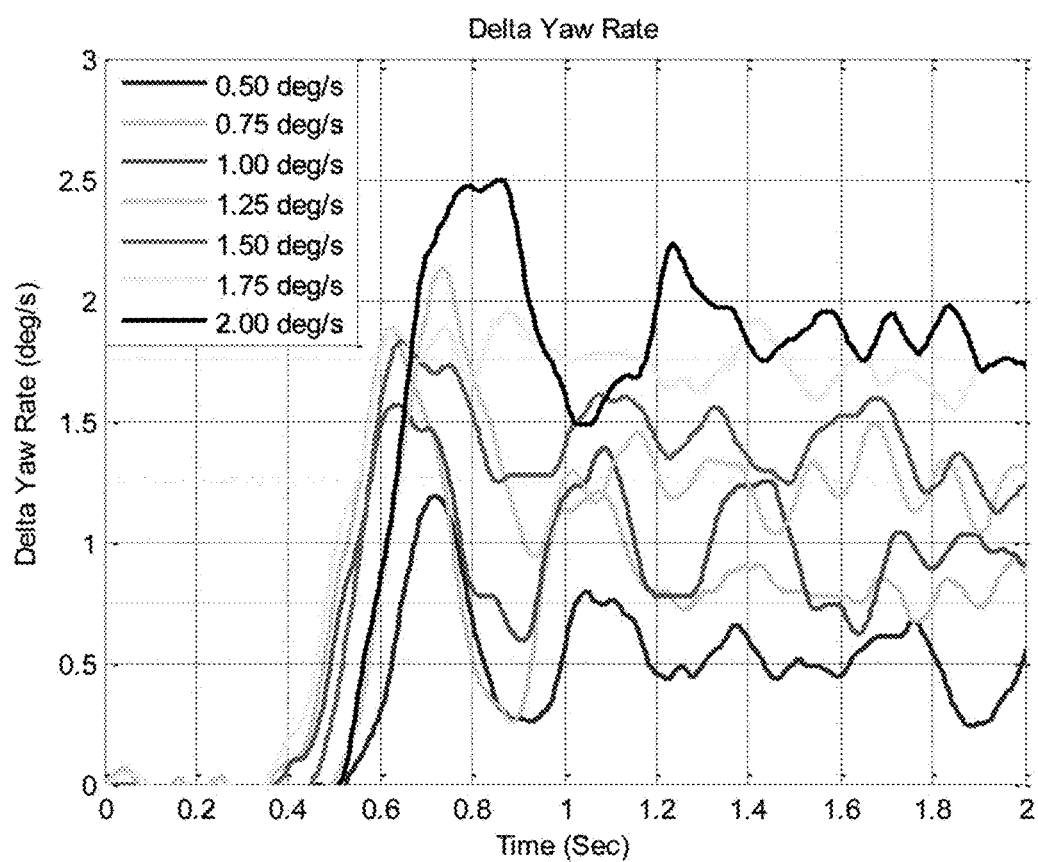
FIG. 3 is a graph illustrating a yaw rate change per time according to each target steering angle.

$V_y$: transverse speed
$\gamma$: yaw Rate
$e_y$: Lateral Offset Error
$e_\varepsilon$: Heading Angle error
$\delta_f$: steering angle
KL: curvature
$V_x$: Longitudinal speed
$M_z$: Moment by differential braking Controlling of the yaw rate per time according to each target steering angle may be achieved as illustrated in a graph of FIG. 3. As illustrated in the drawing, it may be understood that a change deviation of the yaw rate per time is gradually reduced as time passes.

FIG. 4 is a graph illustrating the yaw rate change per time when the target steering angle is 1 degree per second, and FIG. 5 is a graph illustrating the yaw rate change per time when the target steering angle is 2.25 degrees per second.

In both cases, it can be understood that a rate of change in the yaw rate per time is maximum at 0.5 seconds, and then gradually reduced, and thus the deviation is reduced.

The system for preventing vehicle collision using the yaw rate, and the method of preventing vehicle collision using the same can minimize the user's confusion due to the returning control of the vehicle and can provide the comfortable ride.

And thus, it is possible to considerably reduce the secondary accident. Further, it is possible to precisely calculate the control angle for controlling the wheel using the yaw rate.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of preventing vehicle collision, comprising steps of:
    estimating collision with an object at a steering detector of a vehicle;
    calculating a yaw rate of the vehicle at a calculator when the collision with the object is estimated to occur;
    calculating a target steering angle according to the yaw rate calculated by the calculator;
    comparing the calculated yaw rate with a threshold value by the calculator; and
    performing a steering operation for returning the vehicle according to the target steering angle by at least one of a wheel controller and a brake controller.

2. The method of claim 1, wherein, in the step of performing the steering operation for returning the vehicle, the brake controller performs the steering operation for returning the vehicle according to the target steering angle, when the calculated yaw rate is less than the threshold value.

3. The method of claim 2, wherein, in the step of performing the steering operation for returning the vehicle, the wheel controller subsidiarily performs the steering operation of the vehicle, when a slip greater than or equal to a preset reference value is generated at a wheel controlled while the brake controller performs the steering operation.

4. The method of claim 1, wherein, in the step of performing the steering operation for returning the vehicle, the brake controller and the wheel controller simultaneously perform the steering operation of the vehicle, when the calculated yaw rate is greater than or equal to the threshold value.

5. The method of claim 4, wherein, in the step of performing the steering operation for returning the vehicle, the brake controller performs the steering operation of the vehicle by the threshold value, and the wheel controller performs the steering operation of the vehicle by a difference between the target steering angle and the threshold value, when the calculated yaw rate is greater than or equal to the threshold value.

6. A method of preventing vehicle collision, comprising steps of:
    estimating collision with an object at a steering detector of a vehicle;
    calculating a yaw rate of the vehicle at a calculator when the collision with the object is estimated to occur;
    calculating a target steering angle according to the yaw rate calculated by the calculator; and
    performing a steering operation for returning the vehicle according to the target steering angle by at least one of a wheel controller and a brake controller,
    wherein in the step of performing the steering operation, when the calculated yaw rate is greater than or equal to the threshold value, the brake controller performs the steering operation of the vehicle by a threshold value and the wheel controller performs the steering operation of the vehicle by a difference between the target steering angle and a threshold value.

7. A system for preventing vehicle collision, comprising:
    a steering detector configured to detect collision with an object;
    a calculator configured to calculate a yaw rate of a vehicle and to calculate a target steering angle when the collision with the object is to occur;
    a brake controller configured to control a steering operation of the vehicle according to the target steering angle; and
    a wheel controller interlocked with the brake controller and configured to control the steering operation of the vehicle according to the target steering angle,
    wherein when the calculated yaw rate is greater than or equal to a threshold value, the brake controller performs the steering operation of the vehicle by the threshold value, and the wheel controller performs the steering operation of the vehicle by a difference between the target steering angle and a threshold value.

\* \* \* \* \*